United States Patent
Silver

[15] 3,699,352
[45] Oct. 17, 1972

[54] MULTI-RANGE REGULATED DC POWER SUPPLY

[72] Inventor: Arthur E. Silver, Wantagh, N.Y.
[73] Assignee: Power Designs, Inc., Westbury, N.Y.
[22] Filed: March 8, 1971
[21] Appl. No.: 121,995

[52] U.S. Cl. ...................307/75, 307/43, 307/56, 307/80, 323/4, 323/22 T, 323/25
[51] Int. Cl. ............................................... H02j 1/00
[58] Field of Search.........307/43, 44, 48, 69, 70, 75, 307/80, 81, 85, 43 PS, 56; 340/331; 331/129, 130, 131; 250/206; 321/9; 320/48; 323/4, 22 T, 25

[56] References Cited

UNITED STATES PATENTS

| | | | |
|---|---|---|---|
| 3,514,688 | 5/1970 | Martin | 321/9 R X |
| 3,101,442 | 8/1963 | Darbie et al. | 307/43 PS X |
| 3,270,334 | 8/1966 | Steele, Jr. | 340/331 X |
| 3,479,575 | 11/1969 | Wright et al. | 320/48 |

FOREIGN PATENTS OR APPLICATIONS

| | | | |
|---|---|---|---|
| 1,121,695 | 1962 | Germany | 307/75 |
| 838,674 | 1939 | France | 250/206 |

Primary Examiner—Gerald Goldberg
Attorney—Arthur B. Colvin

[57] ABSTRACT

A regulated DC power supply which has a multiplicity of unregulated DC sources and a multiplicity of electronic series resistance elements whose resistance is varied with the DC input source or load changes to maintain the voltage or current at the load at a constant level, an electronic control system being provided which automatically selects the required unregulated source and the series resistance element most suited to provide the desired voltage or current at the load.

10 Claims, 1 Drawing Figure

PATENTED OCT 17 1972
3,699,352
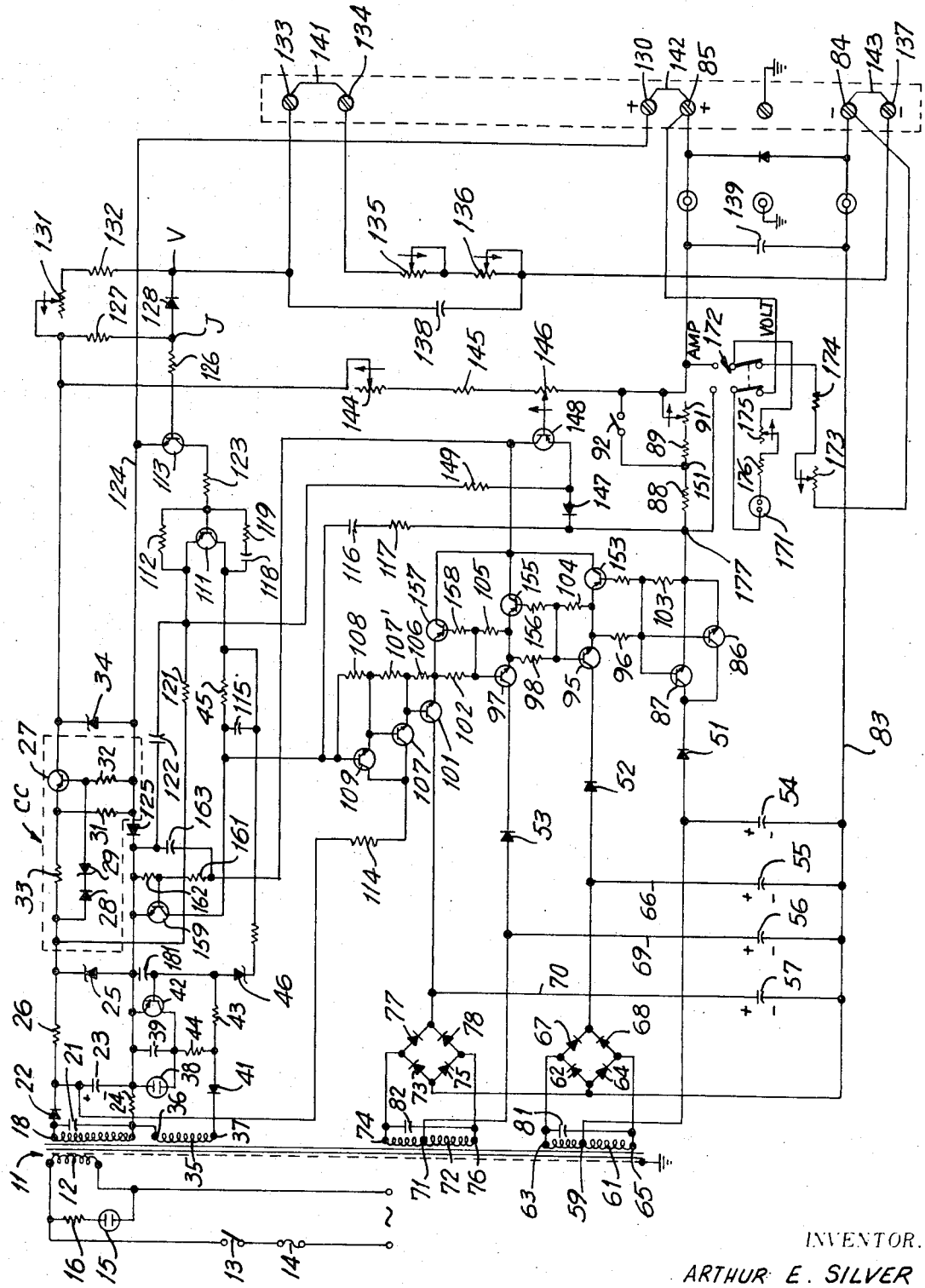
INVENTOR.
ARTHUR E. SILVER
BY
ATTORNEY

MULTI-RANGE REGULATED DC POWER SUPPLY

As conducive to an understanding of the invention, it is to be noted that conventional DC voltage and current regulators of the "series" type, consist of an unregulated DC source and a series element having electrical resistance between the source and the load. This resistance is varied with DC input source or load changes to maintain the voltage or current at the load at a constant value.

The operating range of a regulator of this type is limited by the maximum input voltage or current available from the unregulated source and the voltage, current or power handling capability of the electrical series element.

Where the available voltage or current from the unregulated source is not sufficient to supply the load requirements, the power supply will not be able to furnish the regulated output required by the load.

Where a power supply is provided which has a single unregulated power source capable of supplying the maximum output voltage and current desired, under many conditions of operation the power supply is not required simultaneously to deliver both of such maximum voltage and current outputs, although the single power source would have to be designed to handle both of said maximum parameters. Thus, the equipment would have to be unduly large in size and use more expensive components.

It is accordingly among the objects of the invention to provide a DC power supply capable of supplying a plurality of ranges of different regulated DC voltage-current outputs which will automatically switch to a particular unregulated power source and electronic series resistance element capable of providing the voltage or current output required by the load, which power supply is relatively simple in construction and has a minimum number of parts commensurate with the wide range of regulated outputs it is capable of supplying.

Another object of the invention is to provide a power supply of relatively small size having a plurality of voltage and current ranges with approximately equal power being available throughout all of the ranges, providing more available output current as the output voltage is decreased.

Another object of the invention is to provide a DC power supply of the above type which will automatically indicate loss of output regulation when the load demands are in excess of the output of the equipment or the DC line voltage input is too low to support desired output levels.

According to the invention, these objects are accomplished by the arrangement and combination of elements hereinafter described and more particularly recited in the claims.

In the accompanying drawing, the single figure is a circuit diagram of an illustrative embodiment of the invention.

Referring now to the drawing, the power supply comprises a transformer 11 having a primary winding 12 which is connected through switch 13 and a fuse 14 to a source of alternating potential. Connected across the primary winding 12 is a neon indicating lamp 15 and associated current limiting resistor 16.

The transformer 11 has a secondary winding 17 which, between its terminals 18 and 19, will illustratively provide 44 volts alternating current. The purpose of the capacitor 21 which is connected across terminals 18 and 19 is to reduce the effect of radio frequency interference (R.F.I.) generated by rectifier 22. Such AC voltage is filtered by means of filter capacitor 23 and rectifier diode 22. The rectifier diode 22 is connected to the positive side of filter capacitor 23, the negative side of which is connected through current limiting resistor 24, to terminal 19 as is the R.F.I. capacitor 21. This filter circuit provides an unregulated voltage of approximately 50 volts DC across capacitor 23 and such voltage is applied to a pre-regulator reference Zener diode 25 which illustratively provides a voltage of 20 volts thereacross.

The circuit for the Zener diode 25 is from the positive side of capacitor 23 through resistor 26 and diode 25 back to the negative side of capacitor 23.

The pre-regulated voltage across Zener diode 25 is applied to a constant current source "C.C." comprising a transistor 27, a diode 28, a Zener diode 29 and resistors 31, 32 and 33. Thus, the current will flow from the cathode or positive side of Zener diode 25, through diode 28, thence through Zener diode 29 which provides 6.3 volts that is used as a reference to produce a constant voltage across resistor 33, thence through bias current resistor 32, back to the anode or negative side of Zener diode 25.

The voltage across resistor 33 produces a constant current that flows through the collector emitter of transistor 27 and through a Zener diode 34, which provides the 6.3 volt reference voltage.

The resistor 31 is provided to improve the regulation of the constant current source by forming a bridge network of resistors 31, 32, 33 and diodes 28 and 29.

The transformer 11 has a second secondary 35 which provides a voltage between terminals 36 and 37 of 100 volts AC. This voltage serves as the supply for a warning limit light circuit, comprising neon lamp 38, capacitor 39, diode 41, transistor 42 and resistors 43 and 44 which will be hereinafter described.

The circuit illustratively shown has four unregulated sources of power which are electronically connected to the load by means of three "OR" gates, comprising diodes 51, 52 and 53. Associated with each of said gates is a capacitor 54, 55, 56 and an additional capacitor 57. For ease in reference, the voltage across the respective capacitors 54 through 57 will be referred to as sources 1 to 4 respectively.

The positive side of voltage source 1 or capacitor 54 is connected by lead 58 to a terminal 59 of transformer secondary winding 61. The current will flow from said terminal 59 through capacitor 54 and rectifier diode 62 to terminal 63 of the secondary winding 61 for one-half of the alternating current cycle. For the other half of the alternating current cycle, the current will flow from terminal 59 through capacitor 54 and rectifier diode 64 to terminal 65 of the secondary winding 61.

The positive side of voltage source 2 or capacitor 55 is connected by lead 66 through rectifier diode 67 to terminal 63 of secondary winding 61, the negative side of the capacitor 55 being connected through rectifier diode 64 to terminal 65 of secondary winding 61 for one-half of the alternating current cycle and for the other one-half of the alternating current cycle, terminal 65 of the secondary winding 61 is connected through rectifier diode 68, capacitor 55 and rectifier diode 62 to terminal 63.

The positive side of voltage source 3 or capacitor 56 is connected by lead 69 to terminal 71 of secondary winding 72, the negative side of the capacitor 56 being connected through rectifier diode 73 to terminal 74 of secondary winding 72 for one-half of the cycle and for the other half of the cycle the positive side of the capacitor 56 is connected to terminal 71 and the negative side is connected through rectifier diode 75 to terminal 76 of the secondary winding 72.

The positive side of the source 4 or capacitor 57 is connected by lead 70 through rectifier diode 77 to terminal 74 and the negative side of capacitor 57 is connected through rectifier diode 75 to terminal 76 for one-half of the alternating current cycle and for the other half of the cycle the positive side of the capacitor 57 is connected through rectifier diode 78 to terminal 76 and the negative side of capacitor 57 is connected through rectifier diode 73 to terminal 74.

In the illustrative embodiment herein, source 1 and source 2, i.e., capacitors 54 and 55, derive their voltage from transformer secondary terminals 65, 59 and 63 which provides an alternating current voltage of approximately 19 volts. Illustratively the direct current voltage developed across capacitor 54 of source 1 is from 9 to 12 volts and across source 2 or capacitor 55 is from 19.2 to 25 volts. Source 3 and source 4, i.e., capacitors 56 and 57 derive their voltages from transformer secondary terminals 76, 71 and 74 which provides an alternating current voltage of 58 volts. Illustratively, the DC voltage developed across capacitor 56 or source 3 is from 30.6 volts to 40 volts and across source 4 or capacitor 57 is from 62.2 to 80.5 volts.

The purpose of the capacitor 81 which is connected across terminals 63, 65 and the capacitor 82 which is connected across terminals 74, 76 is to reduce the effect of radio frequency interference (R.F.I.) generated by rectifier diodes 62, 64, 67, 68 and 73, 75, 77, 78.

It is to be noted that the negative outputs of source 1 to 4 or capacitors 54 to 57 are connected together by lead 83 and this lead is connected directly to the negative DC output terminal 84 of the power supply.

The positive output of source 1, i.e., capacitor 54, is connected to the positive DC output terminal 85 of the power supply through the "OR" gate defined by diode 51, the regulating transistors 86 and 87, the output current sensing resistor 88 and either resistor 89, 91 or switch 92. The resistor 91 illustratively provides an 0.5 ampere maximum output current and the switch 92 illustratively provides a 5.0 ampere maximum output current.

The positive output source 2, i.e., capacitor 55 is connected to the positive DC output terminal 85 through the "OR" gate defined by diode 52, the regulating transistor 95, the current sensing resistor 96 for source 2, through the base-emitters of transistors 86, 87, resistor 88 and either series connected resistors 89, 91 or switch 92.

The positive output of source 3, i.e., capacitor 55 is connected to the positive DC output terminal 85 of the power supply, through the "OR" gate defined by diode 53, the regulating transistor 97, the current sensing resistor 98 for source 3, through the base-emitter of transistor 95, through the current sensing resistor 96 of source 2, through the base-emitters of transistors 86, 87 and resistor 88 thence through either series connected resistors 89, 91 or switch 92.

The positive output of source 4, i.e., capacitor 57 is connected to the positive DC output terminal 85 through the regulating transistor 101 of source 4, the current sensing resistor 102 for source 4, through the base-emitter of transistor 97, through the current sensing resistor 98 of source 3, through the base-emitter of transistor 95, through the current sensing resistor 96 of source 2, through the base emitters of transistors 86, 87, resistor 88 and through either series connected resistors 89, 91 or switch 92.

The resistor 103 which is connected across the base-emitters of transistors 86, 87 provides current bias for regulating transistor 95 of source 2. The resistor 104 which is connected across the base-emitter of regulating transistor 95 provides current bias for regulating transistor 97 of source 3. The resistor 105 which is connected across the base-emitter of regulating transistor 97 provides current bias for regulating transistor 101 of source 4. The resistor 106 which is connected across the base-emitter of regulating transistor 101 provides current bias for transistor 107. The resistor 107' which is connected across the base-emitter of transistor 107 provides current bias for transistor 109. The resistor 108 which is connected across the base-emitter of transistor 109 provides current bias for transistor 111. The resistor 112 connected across the base-emitter of transistor 111 provides current bias for transistor 113.

The base of the regulating transistor 101 of source 4 is connected to the emitter of driver transistor 107 and the base of driver transistor 107 is connected to the emitter of driver transistor 109. The collector of driver transistors 107, 109 are connected together and in turn connected through current limiting resistor 114 to the positive side of capacitor 23.

The base of driver transistor 109 is connected to the collector of amplifier transistor 111 through warning light sensing resistor 45. The capacitor 115 is connected across resistor 45 in order to eliminate parasitic oscillations.

An RC network consisting of capacitor 116 and resistor 117 is connected from the base of transistor 109 to the connected emitters of transistors 86, 87 and serves to eliminate parasitic oscillations.

The RC network consisting of capacitor 118 and resistor 119 is connected across the base to emitter contacts of amplifier transistor 111, in order to stabilize the power supply amplifier circuitry throughout its entire operating range.

The emitter of transistor 111 is connected through decoupling resistor 121, to the positive side of the preregulator reference Zener diode 25 which illustratively provides a reference voltage of 20 volts. Resistor 121 and capacitor 122 form an RC network which de-couples the Zener noise of diode 25 from the amplifier circuitry.

The base of transistor 111 is connected through current limiting resistor 123 to the collector of transistor 113. The emitter of transistor 113 is connected by lead 124 to the anodes of Zener diode 34 and diode 125 and one end of resistors 31, 32. In addition, the emitter of transistor 113 is also connected to positive sensing terminal 130.

The base of transistor 113 is connected through current limiting resistor 126 to the junction J between resistor 127 and the anode of diode 128. other other side of resistor 127 is connected to the positive 6.3 volt reference voltage provided at the cathode of Zener diode 34.

Resistor 127 provides a bias current through diode 128, which is used to compensate for changes in the base-emitter voltage of transistor 113 due to the temperature changes. The cathode of diode 128 is the voltage mode sensing point V of the power supply. At this point the output voltage of the power supply is compared to the reference voltage produced by Zener diode 34 (6.3 volts) by means of the divider network consisting of divider current adjusting potentiometer 131, divider current determining resistor 132, remote programming terminals 133, 134, coarse output voltage adjusting resistor 135 and fine output adjusting resistor 136.

The divider current will flow from the cathode of Zener diode 34, through resistors 131, 132, 135, 136 to negative sensing terminal 137. The bias current flowing through resistor 127 will control the base biasing of transistor 113 and also flow through divider resistors 135 and 136.

The capacitor 138 which is connected across voltage adjusting resistors 135, 136 decreases the amplitude of the ripple and noise at the input to the voltage amplifier transistor 113.

The positive side of capacitor 139 is connected to the positive DC output terminal 85 and the negative side of capacitor 139 is connected to the negative DC output terminal 84. The capacitor supplies transient energy which is required by the load that is beyond the frequency band width of the voltage regulator circuitry.

It is to be noted that when the output voltage of the power supply is being controlled internally by the adjustment of variable potentiometers 135, 136, the remote programming terminals 133, 134 are connected by a jumper 141. When the output voltage is being controlled by external means such as resistors or reference voltages, the internal potentiometers 135, 136 are set to "0" ohms and external programming means (not shown) replaces the jumper 141 between the remote programming terminals 133, 134.

When the output voltage is sensed directly at the positive and negative DC output terminals 85, 84, a jumper 142 is connected between positive DC output terminal 85 and positive sensing terminal 130 and a jumper 143 is connected between negative output terminal 84 and negative sensing terminal 137.

When the output voltage is being sensed remotely, the positive sensing terminal 130 is connected to the desired location of the lead that goes from the positive DC terminal 85 to the load and the negative sensing terminal 137 is connected directly to the desired location of the lead that goes from the negative DC terminal 84 to the load.

The system has a current limiting circuitry consisting of a two-range adjustable current sensing circuit, illustratively of from "0 to 0.5 amps" and from "0 to 5.0 amps" DC; a fixed current sensing circuit for source 2, i.e., capacitor 55; a fixed current sensing circuit for source 3, i.e., capacitor 56 and a fixed current sensing circuit for source 4, i.e., capacitor 57. These four separate current sensing circuits are all commonly coupled to a gate circuit which controls the biasing of driver transistor 109 which controls the output current of the power supply.

More particularly, the two range adjustable current sensing circuit consists of current sensing resistor 88; 5.0 amps range switch 92; current sensing resistor 89; 0.5 amps range set potentiometer 91; "0 to 5.0 amps" range set potentiometer 144; resistor 145; variable output "current limit" potentiometer 146; diode 147 (used to compensate the change in the base-emitter voltage of current sensing transistor 148 with changes in temperature); transistor 148, resistor 149 which determines the bias current through diode 147 and diode 125 which provides the collector voltage for current sensing transistor 148.

The DC output current will flow from the emitters of transistors 86 and 87, through current sensing resistor 88 to the junction 151 between resistor 89 and switch 92. When switch 92 is closed, the output current will flow through resistor 88 and switch 92 so that the current is only monitored by current sensing resistor 88.

When switch 92 is open, the DC output current will flow through resistor 88 and resistor 89 and potentiometer 91. The potentiometer 91 is adjusted so that the maximum DC output current range being monitored is 10% of the range when the current flows through switch 92. From the junction 151 of switch 92 and resistor 89 the current will flow to the positive DC output terminal 85.

The source 2 sensing circuit, i.e., from capacitor 55 consists of transistor 153, current sensing resistor 96 and resistor 154 which protects the base of transistor 153 from current transients.

The source 3 current sensing circuit, i.e., from capacitor 56, consists of transistor 155, current sensing resistor 98 and resistor 156 which protects the base of transistor 155 against current transients.

The source 4 current sensing circuit, i.e., from capacitor 57, consists of transistor 157, current sensing resistor 102, and resistor 158 which protects the base of transistor 157 against current transients.

The collectors of source 2 current sensing transistor 153, source 3 current sensing transistor 155, source 4 current sensing transistor 157 and the adjustable range current sensing transistor 148 are all commonly coupled to the base of current limit "OR" gate transistor 159 through de-coupling resistor 161.

A bias current resistor 162 is connected across the emitter to base of transistor 159. The capacitor 163 stabilizes the current limit circuitry throughout its operating frequency range. The collector of transistor 159 is connected to the base of transistor 109.

If any of the four current limit circuits above described are energized due to a current exceeding the pre-set level, transistor 159 will be energized which would in turn control the base current of transistor 109 which in turn will limit the output current of the supply to the predetermined set level.

The output voltage or current is monitored by a single meter 171 connected into the desired mode of operation by a switch 172. When operating as a volt meter, the switch 172 is in "volt" position. As a result, the positive DC output terminal 85 of the supply is connected to the meter 171 through switch 172 as shown in the drawing and the negative DC terminal 84 of the supply is connected to the negative side of meter 171 through voltage meter adjustment potentiometer 173, resistor 174, switch 172 and current meter adjustment potentiometer 175 and resistor 176.

When operating as an ammeter, the switch 172 will be in the "amps" position. The junction 177 between resistors 88 and 103 is connected to the positive side of meter 171 through switch 172. The positive output terminal 85 of the supply is connected to the negative side of the meter 171 through switch 172, current meter adjustment potentiometer 175 and resistor 176.

With the circuit above described, when the power supply is operated at an output voltage such that source 1 (capacitor 54) supplies the output power, the transistors 86 and 87 serve as series regulating transistors. The series regulating transistor 95 of source 2 (capacitor 55) would now function as the driver for transistors 86, 87. The series regulating transistor 97 of source 3 (capacitor 56) would now function as a driver for transistor 95 and the series regulating transistor 101 of source 4 (capacitor 57) would now function as a driver for transistor 97.

As a result, when the output voltage is such that source 1 (capacitor 54) supplies the output power, the transistors 95, 97, 101 and 109 would all function as drivers.

If source 1 (capacitor 54) is delivering the output power to the load and the output voltage requirement is increased or the AC line voltage decreases, such that the voltage of source 1 (capacitor 54) is insufficient to supply power to the load, the source 1 "OR" gate 51 will stop conducting current from source 1. As a result, source 1 will be disconnected from the load and at the same time the load current is automatically transferred to source 2 (capacitor 55) through the base-emitter of transistors 86 and 87, source 2 current sensing resistor 96 and source 2 series regulating transistor 95. If source 2 (capacitor 55) is delivering the output power to the load and the output voltage is increased or the AC line voltage decreases such that the voltage of source 2 is insufficient to supply power to the load, the source 2 "OR" gate 52 will stop conducting current from source 2. As a result, source 2 (capacitor 55) will be disconnected from the load and at the same time the load current is automatically transferred to source 3 (capacitor 56) through the base-emitter of transistor 95, source 3 current sensing resistor 98 and source 3 series regulating transistor 97.

If source 3 (capacitor 56) is delivering the output power to the load and the output voltage is increased or the AC line voltage decreases, such that the voltage of source 3 is insufficient to provide power to the load, the source 3 "OR" gate diode 53 will stop conducting current from source 3. As a result, source 3 will be disconnected from the load and at the same time the load current is automatically transferred to source 4, (capacitor 57) through the base-emitter of transistor 97, source 4 current sensing resistor 102 and source 4 series regulating transistor 101.

In the operation of a typical power supply, based on a minimum line voltage of 105 volts AC, a typical set of output ratings that can be delivered by each source is as follows:

| Source | Output Ratings |
|---|---|
| 1 | 0 to 7 VDC at 0 to 5 ADC, |
| 2 | 7 to 15 VDC at 0 to 3 ADC, |
| 3 | 15 to 25 VDC at 0 to 2 ADC, |
| 4 | 25 to 50 VDC at 0 to 1 ADC. |

If the line voltage should be increased to 125 volts AC, typical output ratings would automatically be as follows:

| Source | Output Ratings |
|---|---|
| 1 | 0 to 9 VDC at 0 to 5 ADC, |
| 2 | 9 to 20 VDC at 0 to 3 ADC, |
| 3 | 20 to 34 VDC at 0 to 2 ADC, |
| 4 | 34 to 68 VDC at 0 to 1 ADC. |

As can be seen from the two sets of output ratings, the change over from one source to another is dependent not only on output voltage but also on the available AC line voltage and the power supply will automatically deliver the output ratings required.

In the event that the output requirement is such that it cannot be handled by any of the four sources above described, or if the power supply is in a current limit mode of operation, the warning light 38 will flash about twice per second until the output requirement is again within the power supply capabilities or the supply is no longer within the current limit mode.

Thus, when the power supply is operating within its normal regulation limits, the warning light circuitry is essentially disconnected from the regulator circuitry due to insufficient voltage drop across sensing resistor 45 to energize a 10 volt Zener diode 46. Thus, the neon lamp 38 would not be energized, as transistor 42 would be saturated because of the current flowing from terminal 36, through resistor 24, emitter-base of transistor 42, resistor 43, rectifier diode 41 to terminal 37.

When the current flow through warning light sensing resistor 45 increases sufficiently, due to either current limiting or inability of the supply to deliver a desired output voltage, the voltage drop across resistor 45 will energize Zener diode 46 which has a rate of 10 volts when Zener diode 46 conducts. The base of transistor 42 is reversed biased which stops flow of base current and hence collector current through transistor 42. As a result, the pulsating current will now flow through capacitor 39 until the voltage drop across capacitor 39 reaches the threshold of the limit neon lamp 38. The lamp will then go on and begin to discharge capacitor 39.

The pulsating DC current flowing from transformer terminal 36 to the parallel combination of limit neon lamp 38 and capacitor 39 through the charging resistor 44 and half wave diode 41 to the transformer terminal 37, is insufficient to sustain the operating voltage of the neon lamp 38. The neon lamp 38 will extinguish and capacitor 39 will again charge until the threshold of neon lamp 38 is again reached.

The circuit components are selected so that the "limit" neon lamp 38 will flash about two flashes a second. The capacitor 181 across the base-emitter of transistor 42 integrates the pulsating DC current flowing from transformer terminal 36 through the base-emitter of transistor 42, resistor 43, diode 41 to transformer terminal 37. This is to prevent the pulsating DC ripple from being coupled into the amplifier through the capacitance of Zener diode 46.

Assuming that the line voltage is 105 volts AC, and the load to be connected to the output terminals 84, 85 requires 10 volts output, the operator by setting switch 172 to "volt" position, can adjust potentiometers 135, 136 until meter 171 reads the desired value of 10 volts.

More particularly, the power source 2 (capacitor 55) which can furnish up to 15 volts at 3 amps will be connected in circuit and current will flow from the positive side of capacitor 55 through diode 52, transistor 95, resistor 96, transistors 87 and 86, resistor 88, switch 92 to positive terminal 85, through switch 172, meter 171, resistors 176, 175, switch 172, resistors 174, 173 to negative terminal 84 and back to the negative side of capacitor 55.

With such setting of potentiometers 135, 136, the reference voltage provided by Zener diode 34 will be compared with the selected output voltage of 10 volts at the voltage mode sensing position V and the base drive of transistor 113 will be varied which in turn will set the base drives of transistors 111, 109, 101, 97 and 95 so that the resistance of transistor 95 will be set to provide the desired output of 10 volts.

The current flowing through transistor 95 will flow through transistors 87, 86 providing base drive to saturate such transistors so that their resistance would approach zero.

As a result, the voltage drop across transistors 87, 86 would be approximately zero, so that the voltage at terminal 85, i.e., +10 volts would be applied to the cathode of diode gate 51, to back bias such diode. Consequently, transistors 87, 86 will be cut off from the power source 1 (capacitor 54) so that no current will flow from power source 2 (capacitor 55) into source 1 (capacitor 54).

Since capacitor 54 is required to have a voltage rating of only 10 to 15 volts in order to supply 7 volts at 5 amperes to the output of the supply, the diode gate 51 prevents source 2 (capacitor 55), source 3 (capacitor 56) or source 4 (capacitor 57) from charging capacitor 54 to a voltage beyond its rating. (If there were no diode gate 51, then the voltage rating of capacitor 54 would have to be greater than the maximum rating of the power supply, which is 60 volts for this particular supply. In order to attain the capacitance required for the 7 volts at 5 amperes and the voltage rating for the maximum output of the power supply, the size of the capacitor would have to be increased approximately eight times.

In addition, if not for the fact that the diode 51 breaks the circuit to capacitor 54, the rectified current for capacitor 54 could flow through the transistors 87, 86 which are not capable of regulating due to their being at saturation, so that ripple from source 1 (capacitor 54) would go directly to the load with resultant poor regulation.

The above operation has been described with respect to a desired output voltage of 10 volts in which case the power source 1 (capacitor 54) is cut out of circuit. Assuming that an output voltage of 20 volts is desired, which is beyond the capability of power source 2 (capacitor 55) but is within the capability of power source 3 (capacitor 56), the operation will be similar to the one previously described. Thus, for example, the reference voltage provided by Zener diode 34 will be compared with the selected output voltage of 20 volts at the voltage mode sensing position V and the base drive of transistor 113 will be varied which in turn will set the base drives of transistors 111, 109, 101 and 97 so that the resistance of transistor 97 will be set to provide the desired output of 20 volts.

The current flowing through transistor 97 will flow through transistor 95 and transistors 87, 87 providing base drive to saturate said transistors so that their resistances would approach zero. As a result, the voltage drop across transistors 95, 87 and 86 would be approximately zero so that the voltage at terminal 85, i.e., +20 volts would be applied to the cathodes of diode gates 51 and 52 to back bias such diodes. Consequently, transistors 95, 87, 86 will be cut off from the power sources 2, 1 so that no current will flow from power source 3 into sources 2, 1.

It is apparent from the foregoing that due to the gating circuits employed, a power source may be selected of value to provide the desired output voltage and automatically only the power source that will supply the desired voltage will be connected in circuit.

Assuming that the load resistance has been decreased so that the current demand is extremely high and the demand for voltage is above the capability of source 4 (capacitor 57), due to the sensing circuit above described, transistor 105 would be going to saturation and its resistance would be decreasing. As a result, the current through resistor 45 would be increasing and when the voltage drop across resistor 45 is sufficient to actuate Zener diode 46, the base drive of transistor 42 would be cut off and the pulsating DC from secondary winding 35 and rectifier diode 41 would flow through neon lamp 38 and capacitor 39 to energize said neon lamp in the manner previously described.

Thus, a warning would be given that the system was no longer providing a regulated output voltage to the load.

Assuming that a load is applied to the output terminals and the load resistance has been decreased in value, the voltage regulated power supply operates as follows:

The output voltage will tend to decrease. The decrease in output voltage is sensed by transistor 113 as an increase in base current. The increase in base current of transistor 113 will cause its collector current to increase and such current will flow through the base of transistor 111. As a result, both the base current and collector current of transistor 111 will increase. The increased collector current of transistor 111 will increase the base current of driver transistor 109, which in turn will increase the base current of driver transistor 107. This in turn will increase the base current of driver transistor 101 (which is also the source 4 series regulating transistor) and this will increase the base current of driver transistor 97 (which is the source 3 series regulating transistor) which in turn will increase the base current of driver transistor 95 (which is the source 2 series regulating transistor).

As a result, the DC output load current will increase until the output voltage is within the load regulating specification of the power supply.

The above operation was described with respect to an output of from 7–15 volts DC which is in the range of source 2. The operation at 20 volts DC which is in the range of source 3 is similar except that the transistor 97 now becomes the source 3 series regulating transistor due to the gating action previously described which cuts out the other elements of the circuit. The increase in the base current of transistor 97 causes its collector current to increase and such current flows through resistor 98, the base-emitter of transistor 95, resistor 96, the base-emitters of transistors 86, 87 to the positive DC output of the power supply and to the load until the output voltage is at the required amount.

As above mentioned, when transistor 97 is acting as a series regulator, the "OR" gate diodes 51 and 52 have automatically disconnected sources 1 and 2 from the load.

The equipment can also be set to provide current limiting. More particularly, assuming that it was desired to supply 5 volts at a maximum current of 2 amperes to the load, the switch 172 would be set to the amp position and the potentiometer 146 would be adjusted to provide 2 amps current flow. In making such setting, it is necessary to momentarily connect a load of less than 2.5 ohms across the terminals 84, 85.

Assuming that the resistance of the load should decrease so that more than 2 amps is being drawn, the system will provide a warning that the load is demanding excess current.

Thus, with an output voltage of 5 volts which is being supplied by capacitor 54, as the current demand increases, the voltage drop across resistor 88 will increase to forward bias the emitter to base of transistor 148. The resultant increase of collector current will flow to the base of transistor 159 and forward bias said transistor with resultant increase of collector current.

The collector current of transistor 159 will flow from the positive side of Zener diode 25 (+20 volts) through decoupling resistor 121, emitter to collector of transistor 111, warning light sensing resistor 45 and through the collector to emitter of transistor 159.

When the collector current of transistor 159 has increased to a predetermined value, the increased voltage drop across resistors 121 and 45 will reduce the collector-to-emitter voltage of transistor 111 to zero. When this occurs, the voltage regulating transistors 111 and 113 will have no effect on the bias current of driver transistor 109.

Thus, the bias current of driver transistor 109 will be entirely dependent on the collector current of transistor 159 which in turn is entirely dependent on the load current flowing through the current sensing resistor which forward biased current sensing transistor 148. The power supply would now be operating in a constant current mode.

The constant current mode is indicated by the flashing neon lamp 38 which illuminated due to the increased current flowing through sensing resistor 45 (previously described).

If the load current from sources 2, 3 and 4 is increased to the maximum predetermined limit of the source, the voltage drop across one of the source current sensing resistors 96, 98 or 102 will forward bias the associated current sensing transistor 153, 155 or 157.

Thus, for example:

1. If the load current of source 2 is greater than 3 ADC, the voltage drop across resistor 96 will forward bias transistor 153.

2. If the load current of source 3 is greater than 2 ADC, the voltage drop across resistor 98 will forward bias transistor 155.

3. If the load current of source 4 is greater than 1 ADC the voltage drop across resistor 102 will forward bias transistor 157.

Since the collectors of transistors 153, 155 and 157 are commonly coupled to the collector of current sensing transistor 148, the current limit operation is the same as that previously described when the collector current was flowing through transistor 148.

It is apparent with the circuit above described, that the system will automatically select an appropriate unregulated power source based on the voltage requirement at the output and automatically switch such power source into circuit and provide a regulated output voltage within the appropriate range. Furthermore, the equipment may automatically be set to provide a desired current output and will automatically select the available power source which will give the desired output current.

The equipment will also automatically indicate when the output voltage requirement is such as to exceed the capabilities of the equipment and will also indicate when the supply is being operated in a current limit mode of operation.

Having thus described my invention, what I claim as new and desire to secure by Letters Patent of the United States is:

1. A multi-range regulated DC power supply having output terminals to which a load may be connected, comprising a plurality of unregulated DC power sources each capable of supplying a different maximum desired output voltage and each also capable of supplying a different range of voltage-current outputs, a single automatic electronic control system connected in circuit between said plurality of unregulated power sources and said output terminals, said control system comprising voltage regulating means for all of said individual power sources, said voltage regulating means including a multiplicity of variable electrical resistances, a diode in circuit with each of said resistances, each of said resistances being connected through said diode to an associated unregulated source and the output terminals, means based on a given load requirement to utilize one of said variable electrical resistances and its associated diode to provide a regulated output voltage to the load and based upon a variation in the load requirement which exceeds the capability of the unregulated source in circuit, to smoothly decrease the current flow through said diode and associated electrical resistance and simultaneously provide increased current flow from one or more of the other unregulated sources, associated electrical resistances and diodes, to provide continuous regulated DC output voltage across the load to meet the load requirement.

2. The combination set forth in claim 1 in which each of said unregulated DC power sources is capable of supplying a different range of voltage outputs and the automatic control system selects the particular unregulated power source which will supply the required output to the load connected to said output terminals.

3. The combination set forth in claim 1 in which means are provided to indicate when the output voltage requirement of the load exceeds the capabilities of said DC power sources.

4. The combination set forth in claim 1 in which each of said unregulated DC sources comprises a capacitor, means are provided respectively to charge each of said capacitors to a different predetermined voltage, said variable electrical means being connected in series between one side of each of said capacitors and the corresponding polarity side of said DC output terminals, the other side of said capacitors being connected to the corresponding other side of said DC terminals, and said diode is connected in each series circuit, except the circuit including the capacitor charged to the maximum voltage, between an associated capacitor and the associated electrical means.

5. The combination set forth in claim 4 in which each of said variable electrical resistances is a transistor, the emitter of the transistor associated with the capacitor providing the maximum voltage, being electrically connected to the base of the transistor providing the next lower voltage, said connections being successively repeated to the base of the transistor providing the minimum voltage, the emitter of said last named transistor being connected to one of the output terminals, means to compare the output voltage with a reference voltage and to provide drive for said plurality of transistors, whereby the transistors associated with the power sources whose voltage is insufficient to provide the desired output are driven into saturation and each is disconnected from its associated unregulated power source by means of its associated diode being inadequately biased, whereby the only power sources being connected to said output terminals are those capable of supplying the desired output.

6. A multi-range regulated DC power supply having output terminals to which a load may be connected, comprising a plurality of unregulated DC power sources each capable of supplying a different maximum desired output voltage and each also capable of supplying a different range of voltage-current outputs, a single automatic electrical control system connected in circuit between said plurality of unregulated power sources and said output terminals, said control system comprising current regulating means for all of said individual power sources, said current regulating means including a multiplicity of variable electrical resistances, a diode in circuit with each of said resistances, each of said resistances being connected through said diode to an associated unregulated source and the output terminals, means based on a given load requirement to utilize one of said variable electrical resistances and its associated diode to provide a regulated output current to the load and based upon a variation in the load requirement which exceeds the capability of the unregulated source in circuit, to smoothly decrease the current flow through said diode and associated electrical resistance and simultaneously provide increased current flow from one or more of the other unregulated sources, associated electrical resistances and diodes, to provide continuous regulated DC output current through the load to meet the load requirement.

7. The combination set forth in claim 6 in which each of said unregulated DC power sources is capable of supplying a different range of current outputs and the automatic control system selects the particular unregulated power source which will supply the required output to the load connected to said output terminals.

8. The combination set forth in claim 6 in which means are provided to indicate when the output voltage-current requirement of the load exceeds the capabilities of said DC power sources.

9. The combination set forth in claim 6 in which each of said unregulated DC sources comprises a capacitor, means are provided respectively to charge each of said capacitors to a different predetermined voltage, said variable electrical means being connected in series between one side of each of said capacitors and the corresponding polarity side of said DC output terminals, the other side of said capacitors being connected to the corresponding other side of said DC terminals, and said diode is connected in each series circuit, except the circuit including the capacitor charged to the maximum voltage, between an associated capacitor and the associated electrical means.

10. The combination set forth in claim 9 in which each of said variable electrical resistances is a transistor, the emitter of the transistor associated with the capacitor providing the maximum voltage, being electrically connected to the base of the transistor providing the next lower voltage, said connections being successively repeated to the base of the transistor providing the minimum voltage, the emitter of said last named transistor being connected to one of the output terminals, means to compare the output voltage with a reference voltage and to provide drive for said plurality of transistors, whereby the transistors associated with the power sources whose voltage is insufficient to provide the desired output are driven into saturation and each is disconnected from its associated unregulated power source by means of its associated diode being inadequately biased, whereby the only power sources being connected to said output terminals are those capable of supplying the desired output voltage-current.

* * * * *